United States Patent Office 2,753,252
Patented July 3, 1956

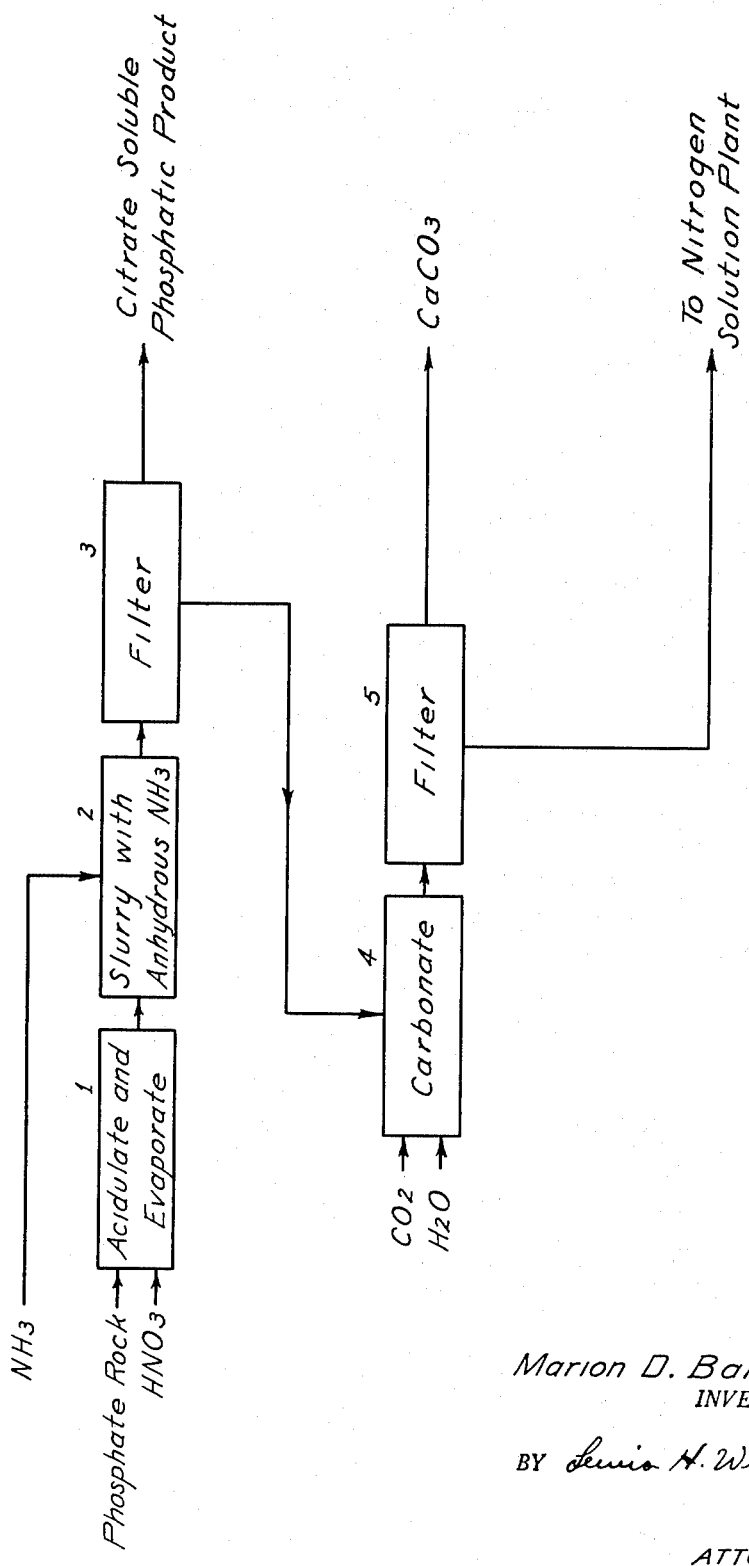

2,753,252

FERTILIZER MANUFACTURE

Marion D. Barnes, El Dorado, Ark., assignor, by mesne assignments, to Monsanto Chemical Company, St. Louis, Mo., a corporation of Delaware Application March 22, 1952, Serial No. 277,995

7 Claims. (Cl. 71—43)

This invention relates to the production of fertilizers and more particularly to a process of producing citrate soluble phosphatic materials.

Both of the following two major accomplishments must be effected in most processes for the manufacture of available phosphate for fertilizers. First, in all such processes it is necessary to decompose the apatite structure of the calcium-phosphorus containing material such as phosphate rock and thus render the $P_2O_5$ content of the rock available to plants as a food. Secondly, in most such processes it is necessary to separate the calcium oxide from the resulting mixture to such extent that the ratio of about 3.5/1 of calcium oxide to $P_2O_5$ in the initial phosphate rock will be reduced to a value sufficiently low to minimize the reversion of the phosphatic mixture to tricalcium phosphate due to changing environment and conditions of said mixture, tricalcium phosphate being relatively unavailable to plants. In conventional fertilizer manufacture acidulation of phosphate rock with sulfuric acid almost without exception has been the means for obtaining the two above objectives. While in the conventional process for making regular superphosphate the calcium oxide is not separated from the $P_2O_5$, it is effectively tied up as calcium sulphate so that substantially no reversion takes place.

Because of the increasing demand for high analysis fertilizers and the increasing shortage and cost of sulfuric acid, efforts have been made within the past few years to develop a commercially feasible process wherein nitric acid instead of sulfuric acid is employed for acidulating phosphate rock. However, because of a number of presently unsolved difficulties encountered, no commercially acceptable process has been developed. One difficulty of major concern is that the fertilizer product, known as a nitrophosphate, has a very poor physical condition. It absorbs moisture at relatively low humidity and becomes quite wet and sticky, thereby presenting problems of distribution and handling. In an alternative method of treating phosphate with nitric acid, another substantial difficulty is one of processing and involves the separation of calcium nitrate from the $P_2O_5$ in an aqueous system, e. g. filtering a suspension of monocalcium phosphate from an aqueous solution of calcium nitrate. This filtering operation is very slow and to a large extent tends to render the process impractical.

An object of the present invention is to provide an improved process of making phosphatic fertilizers. A further object is to provide such a process characterized by economy and ease of operation. A still further object is to provide such a process in which the aforesaid difficulties of the prior art are avoided. Other objects will be apparent from the description of this invention given hereinafter.

The above and other objects are accomplished according to this invention broadly by carrying out the process which comprises the steps of reacting calcium-phosphorus containing materials with nitric acid and then removing substantially all of the water from the reaction mixture, mixing the residue with anhydrous ammonia and thus obtaining a mixture of calcium nitrate dissolved in the ammonia and undissolved phosphatic materials, separating out the latter, reacting the anhydrous ammonia solution of the calcium nitrate with ammonium carbonate and thereby obtaining a precipitate of calcium carbonate and a solution of ammonium nitrate, and separating out the calcium carbonate.

This invention will be more readily understood by referring to the accompanying flow sheet showing the major steps of the process. For the sake of clarity a preferred embodiment of the invention will be described with reference to preparing citrate soluble phosphatic materials from phosphate rock. While calcium-phosphorus containing materials broadly are applicable, generally phosphate rock will be used because of its high $P_2O_5$ content. Referring to the flow sheet it will be seen that the raw materials for the process of this invention are phosphate rock, nitric acid, carbon dioxide and water, that the products are citrate soluble phosphatic materials and a solution containing ammonia and ammonium nitrate, which solution may be converted conveniently into a nitrogen solution for use as such, and that the by-product is calcium carbonate. Summarily, the process consists essentially of five steps. Step 1 involves the acidulation of phosphate rock with nitric acid, followed by evaporating the resulting solution to dryness to remove free water, and then heating to remove water of hydration from the residue. Step 2 involves slurrying the residue from step 1 with anhydrous ammonia, and step 3 involves filtering off the solution (calcium nitrate in anhydrous ammonia) from the residue (citrate soluble phosphatic materials). In step 4 the filtrate from step 3 is mixed with carbon dioxide and water whereby calcium carbonate is precipitated and then filtered off in step 5. The ammonium nitrate filtrate (step 5) may be processed to nitrogen solution.

Thus the process of this invention may be divided into three phases comprising (1) acidulating phosphate rock and dehydrating the resulting reaction mixture including calcium nitrate, (2) treating the mixture with anhydrous ammonia which leaves the desired phosphate product undissolved therein and separating from the latter the calcium nitrate by selective solvent action followed by simple filtration or other conventional means, and (3) precipitating from the solution of phase 2 the calcium ion as calcium carbonate which is separated as in phase 2 from the resulting solution of ammonium nitrate in the ammonia.

Describing the invention in greater detail with reference to the flow sheet, nitric acid is mixed with phosphate rock (step 1) and the reaction allowed to go substantially to completion without the applicaion of external heat. Preferably an excess of nitric acid of about 60% to 70% concentration is employed, although other concentrations are suitable. Since substantially all of the water must be removed from the system before carrying out step 2 below, one advantage of using higher concentrations of acid, say 90%–100%, is that there is less water to remove.

Within very broad limits, the particle size of the rock makes no substantial difference. For example, 100 mesh rock gives very good results. The particle size may vary widely from 100 mesh and still give satisfactory results.

After the reaction has subsided, the solution is filtered and the siliceous residue discarded. Although preferred, this filtration may be omitted. Warming, such as for example to 30° C.–40° C., and stirring the solution aids in filtering. Next the solution is evaporated to dryness following which the residue is heated at an increased temperature, the former to drive off free water and the latter to drive off water left behind as hydrates of calcium nitrate. These temperatures are not critical. Good results, e. g. have been obtained at slightly above 100° C. while removing the free water and at 180° C.–200° C. for removing water of hydration; the maximum temperature which may be used for removing water of hydration being less than the temperature at which calcium nitrate decomposes.

Referring to step 2 of the flow sheet, the residue from step 1 is mixed with anhydrous ammonia. Under the preferred conditions, the reaction is carried out at a low temperature (e. g. not above about room temperature) in order to minimize vaporization of the ammonia; the reaction is carried out in a pressure vessel in order to avoid the escape of the ammonia which may vaporize; and the reaction is carried out while agitating the mixture.

From the operation of step 2 there results a mixture comprising citrate soluble phosphatic materials (solid) and a solution of calcium nitrate in the anhydrous ammonia. In step 3 this mixture is separated by filtering out said phosphatic materials as product. Filtration takes place without difficulty. Temperature and pressure conditions of the filtration should be such as to minimize the evaporation of ammonia. At atmospheric pressure, desirably the temperature will not exceed about minus 32° C. (the boiling point of the ammonia). However, higher temperatures are entirely satisfactory, provided elevated pressures are used.

In step 4 the filtrate (solution of calcium nitrate in anhydrous ammonia) is reacted with carbon dioxide and water whereby substantially all of the calcium ions are precipitated from the solution as calcium carbonate, and ammonium nitrate is formed and remains in solution.

In step 5 the calcium carbonate by-product is readily filtered from the solution, taking the usual care to minimize the evaporation of ammonia. Alternatively, in order to avoid dealing with free ammonia in step 5, step 4 can be replaced by a step in which all of the ammonia is evaporated and recovered from the filtrate of step 3, thereby leaving a residue of calcium nitrate which is then taken up in water and reacted with ammonium carbonate. The result is the same, that is, the calcium ion is precipitated practically completely from the solution which is primarily ammonium nitrate. In either event the filtrate from step 5 is suitable for making nitrogen solutions widely used in the industry. A typical nitrogen solution contains about 66% ammonium nitrate, 17% free ammonia and 17% water.

The following example wherein parts and percent are by weight illustrates a specific embodiment of the present invention. It will be understood, however, that this example and the above description serve merely to illustrate ways of practicing the invention and that the invention is not to be limited thereby.

*Example*

A substantially completely citrate soluble phosphatic product was prepared as follows: 40 parts of micronized phosphate rock (i. e. practically all passes a 325 mesh screen) having a $P_2O_5$ content of 34.4% and a calcium oxide content of 50% was mixed with 60 parts of nitric acid of 70% concentration and allowed to react for 30 minutes without application of external heat. Next the resulting solution was warmed to 30° C.–40° C., stirred, filtered and the siliceous residue discarded. The filtrate was evaporated by boiling until all free water had been given off and then the residue was heated at about 180° C.–190° C. until all water of hydration had been expelled. Then the residue was cooled and mixed with 200 parts of liquid anhydrous ammonia. The mixture was stirred and filtered and the filter cake dried. The dried filter cake gave the following analysis:

| | |
|---|---|
| Total $P_2O_5$ percent | 39.7 |
| Water soluble $P_2O_5$ | Trace |
| Citrate soluble $P_2O_5$ percent | 39.7 |
| Citrate insoluble $P_2O_5$ | Nil |

The filtrate was evaporated to one-half its initial volume and then 250 parts of water and 25 parts (excess) of ammonium carbonate were added. The precipitated calcium carbonate was removed by filtration.

By the above process 95.8% of the $P_2O_5$ initially present in the rock was rendered citrate soluble.

From the above description it will be seen that this invention makes a substantial contribution to the art. It eliminates the difficulties of the art mentioned hereinbefore. It produces a high yield of available $P_2O_5$ from phosphate rock with a minimum expenditure of acid. It will be noted that all of the nitric acid consumed is accounted for in the nitrogen solution as ammonium nitrate, the excess nitric acid employed being recycled to the system. Therefore the net result is that the nitric acid employed is only a processing intermediate; it is a raw material for the nitrogen solution rather than for the phosphate end product. It will also be seen that any acid which may appear in the phosphatic product as hydrogen, is supplied by the carbon dioxide and water. Thus, in effect, the process involves the use of carbon dioxide and water for solubilizing phosphate rock.

As many apparently widely different embodiments of this invention may be made without departing from the spirit and scope thereof, it is to be understood that the invention is not limited to the specific embodiments thereof except as defined in the appended claims.

What is claimed is:

1. Process of producing phosphatic materials, which can be dissolved in neutral ammonium citrate solution, and ammonium nitrate which comprises reacting nitric acid with calcium-phosphorus containing material, removing substantially all of the free water and water of hydration from the resulting solution, mixing the resulting residue with anhydrous ammonia and thereby obtaining a mixture comprising calcium nitrate dissolved in the anhydrous ammonia and undissolved phosphatic materials, separating out the phosphatic materials, reacting the anhydrous ammonia solution of calcium nitrate with ammonium carbonate in aqueous solution and thereby obtaining a precipitate of calcium carbonate and a solution of ammonium nitrate, and separating out the calcium carbonate.

2. Process of producing phosphatic materials, which can be dissolved in neutral ammonium citrate solution, and ammonium nitrate which comprises reacting nitric acid with phosphate rock, removing the siliceous material from the resulting solution, removing substantially all of the free water and water of hydration from said solution, mixing the resulting residue with anhydrous ammonia and thereby obtaining a mixture comprising calcium nitrate dissolved in the anhydrous ammonia and undissolved phosphatic materials, separating out the phosphatic materials, reacting the anhydrous ammonia solution of calcium nitrate with ammonium carbonate in aqueous solution and thereby obtaining a precipitate of calcium carbonate and a solution of ammonium nitrate, and separating out the calcium carbonate.

3. Process of producing phosphatic materials, which can be dissolved in neutral ammonium citrate solution, and ammonium nitrate which comprises reacting nitric acid with phosphate rock, removing the siliceous material from the resulting solution, removing substantially all of the free water and water of hydration from said solution, mixing the resulting residue with anhydrous ammonia and thereby obtaining a mixture comprising calcium nitrate dissolved in the anhydrous ammonia and undissolved phosphatic materials, filtering off the phosphatic materials, reacting the anhydrous ammonia solution of calcium nitrate with ammonium carbonate in aqueous solution and thereby obtaining a precipitate of calcium carbonate and a solution of ammonium nitrate having free ammonia therein, filtering off the calcium carbonate, and preparing a nitrogen solution from the ammonium nitrate filtrate.

4. Process of producing phosphatic materials, which can be dissolved in neutral ammonium citrate solution, and ammonium nitrate which comprises reacting nitric acid with phosphate rock, removing the siliceous material from the resulting solution, removing substantially all of the free water and water of hydration from said solution, mixing the resulting residue with anhydrous ammonia and thereby obtaining a mixture comprising calcium nitrate dissolved in the anhydrous ammonia and undissolved phosphatic materials, filtering off the phosphatic materials, removing and recovering the ammonia from the filtrate, dissolving the calcium nitrate residue in water and reacting with ammonium carbonate and thereby obtaining a precipitate of calcium carbonate and an aqueous solution of ammonium nitrate free of ammonia, and separating out the calcium carbonate.

5. Process of producing phosphatic materials, which can be dissolved in neutral ammonium citrate solution, and ammonium nitrate which comprises reacting nitric acid with phosphate rock, removing the siliceous material from the resulting solution, removing substantially all of the free water and water of hydration from the resulting solution, mixing the resulting residue with anhydrous ammonia and thereby obtaining a mixture comprising calcium nitrate dissolved in the ammonia and undissolved phosphatic materials, filtering off the phosphatic materials, evaporating and recovering the ammonia from the filtrate, dissolving the calcium nitrate residue in water and reacting with ammonium carbonate and thereby obtaining a precipitate of calcium carbonate and an aqueous solution of ammonium nitrate free of ammonia, filtering off the calcium carbonate, and preparing a nitrogen solution from the ammonium nitrate utilizing said recovered ammonia.

6. Process of producing phosphatic materials, which can be dissolved in neutral ammonium citrate solution, and ammonium nitrate which comprises reacting nitric acid with calcium-phosphorus containing material, removing substantially all of the free water and water of hydration from the resulting solution, mixing the resulting residue with anhydrous ammonia and thereby obtaining a mixture comprising calcium nitrate dissolved in the anhydrous ammonia and undissolved phosphatic materials, filtering out the phosphatic materials, removing and recovering the ammonia from the filtrate, dissolving the calcium nitrate residue in water and reacting with ammonium carbonate and thereby obtaining a precipitate of calcium carbonate and an aqueous solution of ammonium nitrate free of ammonia, and separating out the calcium carbonate.

7. Process of producing phosphatic materials, which can be dissolved in neutral ammonium citrate solution, and ammonium nitrate which comprises reacting an excess of nitric acid of at least about 60% concentration with phosphate rock, removing the siliceous material from the resulting solution, removing substantially all of the free water and water of hydration from the resulting solution, reacting the resulting residue with liquid anhydrous ammonia in a closed system while agitating and thereby obtaining a mixture comprising calcium nitrate dissolved in the ammonia and undissolved phosphatic materials, filtering off the phosphatic materials, reacting the liquid anhydrous ammonia solution of calcium nitrate with an excess of ammonium carbonate in aqueous solution and thereby obtaining a precipitate of calcium carbonate and a solution of ammonium nitrate having free ammonia therein, filtering off the calcium carbonate and preparing a nitrogen solution from the ammonium nitrate filtrate.

References Cited in the file of this patent

UNITED STATES PATENTS

| | | |
|---|---|---|
| 1,292,293 | Foss | Jan. 21, 1919 |
| 1,849,703 | Boller | Mar. 15, 1932 |
| 1,854,291 | Burdick | Apr. 19, 1932 |
| 1,856,187 | Johnson | May 3, 1932 |
| 2,061,191 | Foss et al. | Nov. 17, 1936 |
| 2,134,013 | Turrentine | Oct. 25, 1938 |
| 2,555,656 | Plusje | June 5, 1951 |

FOREIGN PATENTS

| | | |
|---|---|---|
| 391,495 | Great Britain | May 1, 1933 |
| 411,575 | Great Britain | June 14, 1934 |